US006085635A

United States Patent [19]

Trevisan

[11] Patent Number: 6,085,635

[45] Date of Patent: Jul. 11, 2000

[54] SAFETY DEVICE FOR PNEUMATIC ACTUATORS

[76] Inventor: Giovanni Trevisan, Via Alfieri, 24, 20090 Trezzano Sul Naviglio (Milan), Italy

[21] Appl. No.: 09/057,183

[22] Filed: Apr. 8, 1998

[30] Foreign Application Priority Data

Feb. 11, 1998 [IT] Italy ................................ MI98A0262

[51] Int. Cl.[7] ................................ F01C 9/00; F16J 15/18

[52] U.S. Cl. ............................................ 92/121; 92/165 R

[58] Field of Search .................................... 92/15, 17, 23, 92/121, 122, 123, 124, 125, 165 R, 166, 168

[56] References Cited

U.S. PATENT DOCUMENTS 2,911,956 11/1959 Smith, Jr. .............................. 92/122 X
3,014,462 12/1961 Bloom et al. ............................. 92/124
3,023,741 3/1962 O'Connor ................................. 92/122
3,049,102 8/1962 Reimer et al. ......................... 92/121 X
3,049,103 8/1962 Dumm ..................................... 92/122

*Primary Examiner*—John E. Ryznic
*Attorney, Agent, or Firm*—Hedman, Gibson & Costigan

[57] ABSTRACT

The invention relates to a safety device for pneumatic actuators, for preventing the actuator pinion from being violently ejected, comprising a circular seat, formed on the less diameter portion of the pinion, projecting from the actuator body, and housing a resilient ring element. The resilient ring element engages with the pinion restraining elements, provided on the less diameter portion of the pinion outside of the actuator body, for a time required for allowing the pressure inside the actuator body to be released, through a slot defined about the pinion larger diameter section because of the disengagement of the corresponding sealing gasket from the actuator body.

6 Claims, 2 Drawing Sheets

SAFETY DEVICE FOR PNEUMATIC ACTUATORS

BACKGROUND OF THE INVENTION

The present invention relates to a safety device for pneumatic actuators.

More specifically, the present invention relates to a safety device for pneumatic actuators, specifically designed for preventing the actuator pinion from being violently ejected, under the axial pushing force exerted on the actuator piston by the pressure inside the actuator body.

As known, an actuator pinion is conventionally formed by a single cylindric piece passing through the tubular body of the actuator, perpendicularly to the axis thereof.

Said pinion is provided with different diameters at different portions of the length thereof, and the two cylindric portions of the pinion, communicating with the outside of the actuator body, are sealed with respect to said body by two gaskets, for example two O-rings.

The diameter difference at the end portions of said pinion causes said pinion to be urged by the pressure inside the pneumatic actuator body, in a different manner depending on the cross-section on which said pressure is applied.

This fact generates a pushing force in the direction of the larger cross-section of said pinion, tending to cause the pinion to be ejected from the actuator body.

This pushing or urging force is conventionally counterbiassed in different manners, for example by using a resilient metal ring element, of the type of the so-called Seeger ring, applied to the pinion less diameter projecting portion, outside of the pneumatic actuator body.

However, it would be advantageous to provide a further safety device aiding the above metal resilient ring element and adapted to provide a great operation safety, for example if the mentioned ring element is erroneously applied or fails.

In fact, if the actuator pinion is not properly restrained, as pressurized air is supplied to the inside of the actuator body, then said pinion can be projected with such a force susceptible to seriously damage persons and things which are present within a distance range of several meters from the actuator.

This would be particularly dangerous if the actuator pinion has a large size, considering that the weight of such a pinion can be of the order of some tens of kilograms.

In order to safely prevent the pinion from operating as an impacting projectile, specifically designed safety actuators have been provided, which, however, have a very high cost.

Moreover, in said safety actuators, because of their rather complex construction, the pinion can be assembled with great difficulties and the angular position of said pinion can be hardly changed, and, consequently, said pinion must be frequently disassembled and assembled again in order to modify its position with respect to the actuator body, said disassembling and assembling steps being performed either in the actuator making shop or directly on the system on which the actuator is installed.

SUMMARY OF THE INVENTION

Accordingly, the aim of the present invention is to provide such a safety device for pneumatic actuators preventing the actuator pinion from being violently ejected as the pinion restraining elements fail.

Within the scope of the above mentioned aim, a main object of the present invention is to provide such a safety device for pneumatic actuators, which can be simply constructed and assembled.

Another object of the present invention is to provide such a safety device for pneumatic actuators which can be made at a low cost.

According to one aspect of the present invention, the above mentioned aim and objects are achieved by a safety device for pneumatic actuators, adapted to prevent the actuator pinion from being violently ejected, characterized in that said safety device comprises at least a seat, formed on said pinion and adapted to engage therein a resilient element, for restraining said pinion at least for a time required for allowing the pressure inside the body of said actuator to be released.

According to a preferred embodiment of the present invention, the resilient element is adapted to engage with the actuator body, so as to restrain the pinion for a time necessary to allow the pressure inside the actuator body to be released.

Preferably, the releasing of the pressure inside the actuator body occurs through a slot or gap defined between the larger diameter cross-section of the actuator pinion, upon removing a corresponding sealing gasket from the actuator body, due to a small axial displacement of the pinion.

According to another preferred embodiment of the present invention, the seat engaging therein said resilient element is formed on the pinion less diameter portion projecting from the actuator body.

According to yet another preferred embodiment of the present invention, the seat engaging therein the resilient element is a circular groove formed on the pinion, and the resilient element is a resilient material ring, in particular an O-ring.

BRIEF DESCRIPTION OF THE DRAWINGS

Further characteristics and advantages of the invention will become more apparent hereinafter from the following disclosure, given by way of an illustrative but not limitative example, with reference to the accompanying drawings, where.

DESCRIPTION OF THE PREFERRED EMBODIMENT

In the following disclosure, a preferred embodiment of the present invention will be illustrated by way of an exemplary not limitative example of possible variations of the invention.

Figure 1:
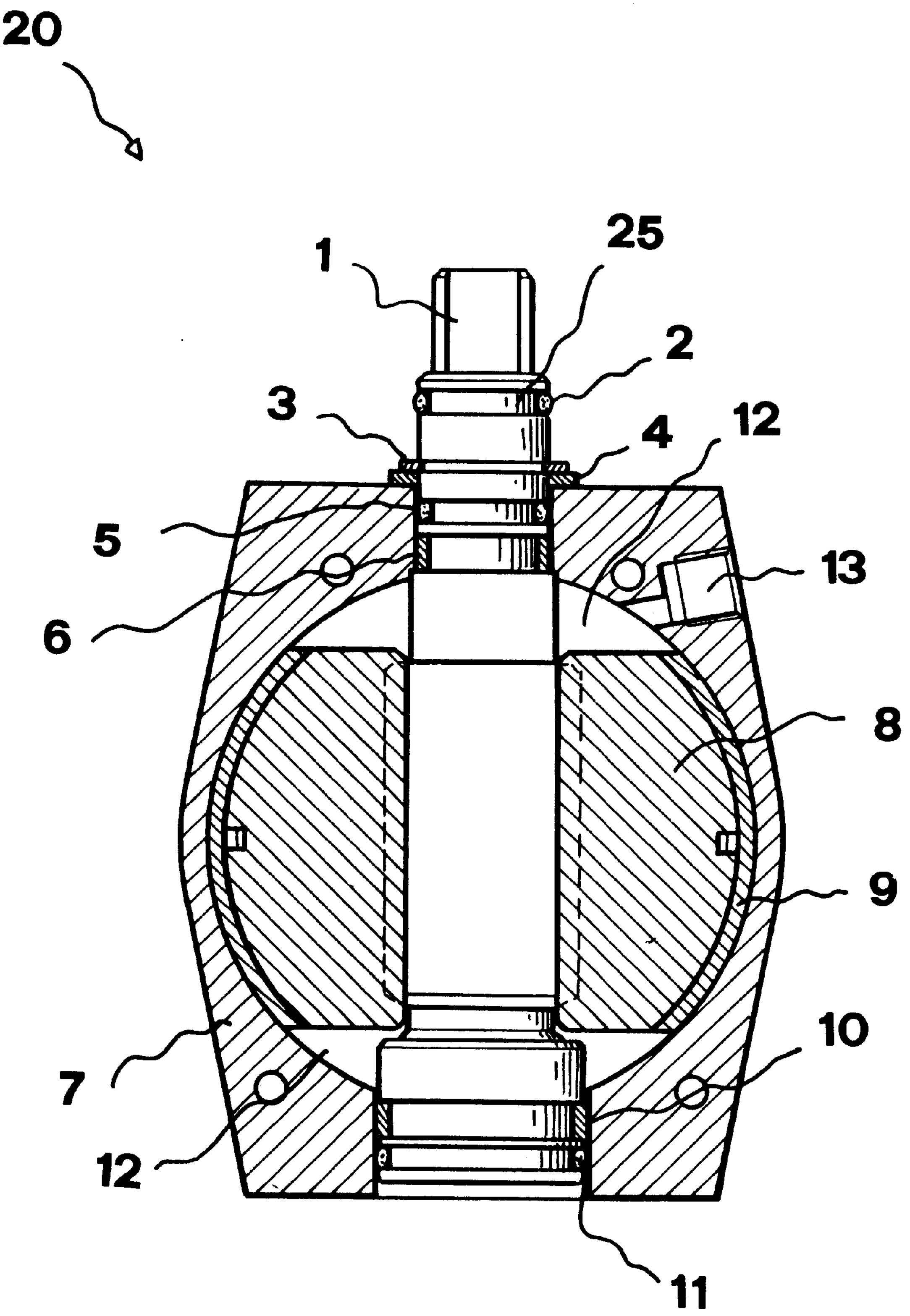
FIG. 1 is a cross-sectional view of the pneumatic actuator, including the safety device according to the present invention, in a working condition thereof.

FIG. 1 is a cross-sectional view illustrating the body 7 of an actuator traversed by a pinion 1, in turn including a safety device according to the present invention, and generally indicated by the reference number 20.

The pinion 1 traversing the actuator body 7 is coupled to a piston 8 provided with an anti-friction pad or shoe 9.

The pinion 1 comprises a substantially cylindric body, having end portions of different diameters.

As shown, the pinion 1 projects with its less diameter portion from the actuator body, and is sealed with respect to said actuator body 7 by an O-ring element 5, being furthermore sealed, at its opposite end portion, by an O-ring element 11.

Further anti-friction ring elements 6 and 10, each of which is associated with one of the end portions of the pinion 1, are moreover provided.

More specifically, the ring element 6 is coupled to the less diameter end portion of the pinion 1, whereas the ring element 10 is coupled to the larger diameter portion of the pinion 1.

Inside the actuator body 7 a pressure chamber or plenum 12 is provided, said plenum being supplied through a supplying nozzle 13.

In this connection it should be pointed out that the pressure in said plenum 12 inside the body 7 of the pneumatic actuator, multiplied for the cross-section difference of the two end portions of the pinion 1 having different diameters, will generate a pushing or urging force on the pinion 1, in an axial direction, which urging force will tend to eject said pinion 1 from the body 7 of the actuator.

This urging force is counter-biassed or balanced, according to a known method, by using a Seeger ring 3, applied at the anti-friction washer 4.

At the less diameter cross-section of the pinion 1 is formed a groove 25 provided for receiving therein a resilient material ring element 2, such as an O-ring.

The groove 25 is moreover formed on that portion of the pinion 1 projecting from the actuator body.

The safety device for pneumatic actuators, for preventing the actuator pinion from being violently ejected from the actuator body, according to the present invention, operates as follows.

At first, it should be apparent that the inventive device is based on the concept of zeroing the urging force tending to axially displace said pinion 1, by releasing the pressure inside the actuator plenum 12, as the pinion 1 has been axially displaced for a small length, for example few millimeters, before a full ejection of said pinion from the actuator body.

This is achieved due to the fact that the resilient material ring element, i.e. the O-ring 2, will contact the actuator body 7, so as to prevent it from disengaging as the sealing gasket 11 on the larger diameter of the pinion 1 is exiting its seat with respect to the actuator body 7.

Thus, the inside pressure of the actuator will be released through the circular slot or gap 14 formed about the greater cross-section of the pinion, as the sealing gasket 11 does not contact the actuator body 7.

Figure 2:
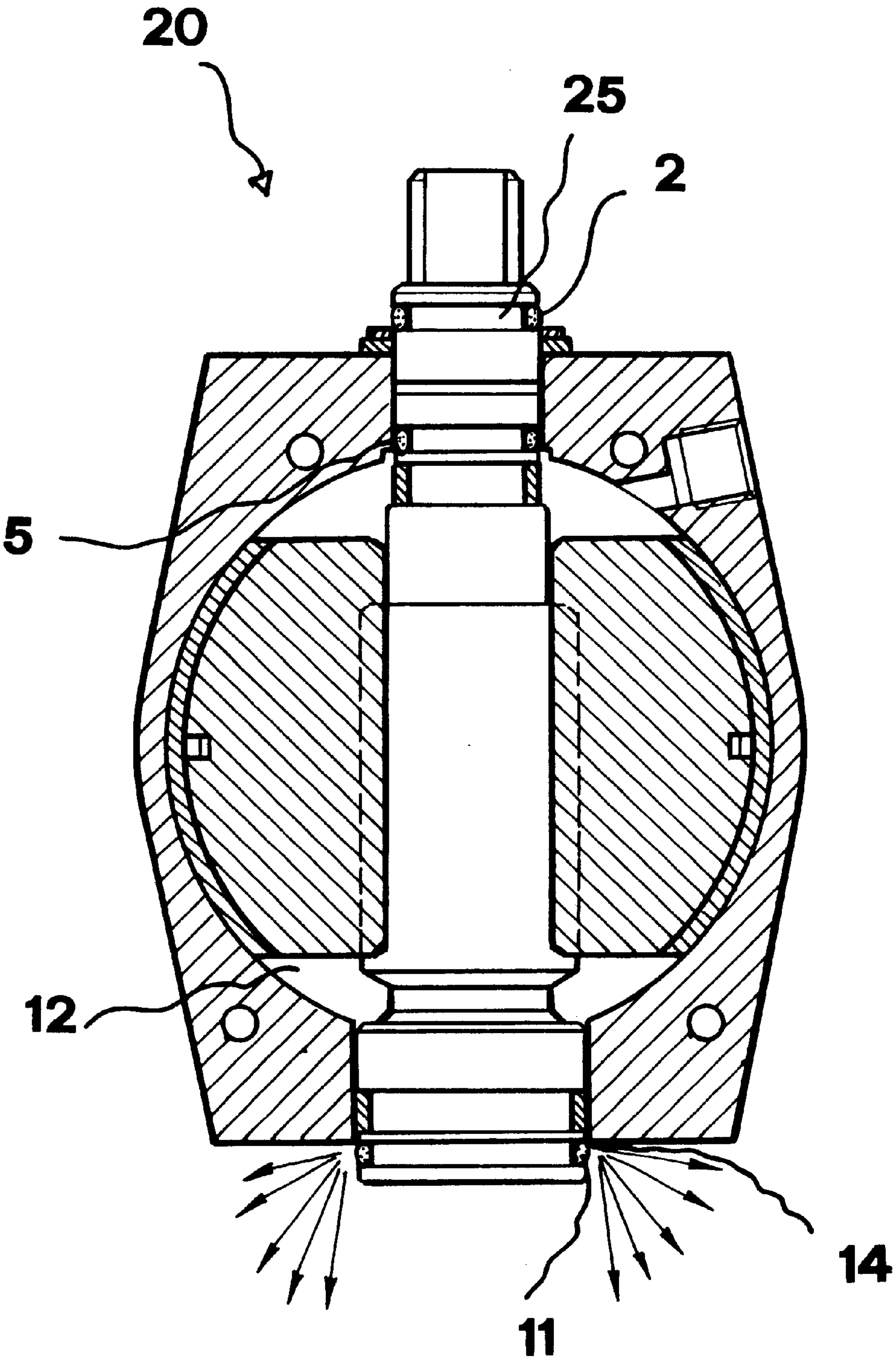
FIG. 2 is a further cross-sectional view of the pneumatic actuator of FIG. 1, under a failure or disengagement condition of the resilient metal ring element.

This fact is schematically shown in FIG. 2 by a plurality of arrows exiting from the actuator body 7 near the circular gap 14.

Thus, even if the actuator is continuously supplied, the axial pushing force on the pinion 1 is cleared, thereby achieving the main object of the invention, i.e. that of preventing the actuator pinion 1 from being violently ejected away from the actuator body 7.

I claim:

1. A safety device for pneumatic actuators, adapted to prevent an actuator pinion from being violently ejected, characterized in that said safety device comprises at least a seat, formed on said pinion, and adapted to engage therein a resilient element, said resilient element being adapted to restrain said pinion at least for a time required for allowing an inside pressure of a body of said actuator to be released.

2. A safety device for pneumatic actuators, according to claim 1, wherein said resilient element engages with said body of said actuator in order to restrain said pinion at least for a time required for allowing the pressure inside said actuator body to be released.

3. A safety device for pneumatic actuators according to claim 2, wherein said pressure inside said actuator body is released through a gap formed about a larger diameter cross-section of said pinion, because of a disengagement of a corresponding sealing gasket from said actuator body, due to a small axial displacement of said pinion.

4. A safety device for pneumatic actuators, according to claim 1, wherein said seat engaging therein said resilient element is formed on a less diameter portion of said pinion projecting from said actuator body.

5. A safety device for pneumatic actuators, according to claim 1, wherein said seat engaging therein said resilient element comprises a circular groove formed on said pinion and said resilient element comprises a resilient material ring element.

6. A safety device for pneumatic actuators, according to claim 5, wherein said resilient material ring element comprises an O-ring element.

* * * * *